United States Patent [19]

Sweedyk

[11] Patent Number: 4,557,249

[45] Date of Patent: Dec. 10, 1985

[54] COMPACT HIGH EFFICIENCY FURNACE

[75] Inventor: James M. Sweedyk, South Bend, Ind.

[73] Assignee: Sundstrand Heat Transfer, Inc., Dowagiac, Mich.

[21] Appl. No.: 694,879

[22] Filed: Jan. 25, 1985

[51] Int. Cl.[4] .............................................. F24H 3/08
[52] U.S. Cl. ............................ 126/110 R; 126/99 D; 126/99 A; 126/110 AA; 237/55; 237/53
[58] Field of Search .............. 126/99 R, 99 D, 110 R, 126/110 B, 110 AA, 110 D, 99 A; 432/223; 237/50, 53, 55, 54

[56] References Cited

U.S. PATENT DOCUMENTS

| 2,109,876 | 3/1938 | Band | 126/99 D |
|---|---|---|---|
| 2,529,574 | 11/1950 | Rush | 126/110 R |
| 2,836,169 | 2/1956 | Reilly | 126/110 R |
| 2,902,265 | 9/1959 | Dubovick | 237/53 |
| 3,394,695 | 7/1968 | Boden | 126/110 R |
| 3,580,237 | 5/1971 | Barsby | 126/110 R |
| 3,667,451 | 6/1972 | Boucher | 126/110 R |
| 4,006,728 | 2/1977 | Nishi et al. | 126/110 R |
| 4,182,303 | 1/1980 | Muckelrath | 126/110 R |
| 4,336,791 | 6/1982 | Kitchhen | 126/110 R |
| 4,342,359 | 8/1982 | Baker | 237/55 |
| 4,351,276 | 9/1982 | Kremer | 237/55 |
| 4,478,158 | 10/1984 | Smith | 126/99 A |
| 4,478,206 | 10/1984 | Ahn | 126/99 A |

FOREIGN PATENT DOCUMENTS 55-146350  11/1980  Japan ..................... 126/110 AA

OTHER PUBLICATIONS

Carrier, Weather Maker, advertisement.

Primary Examiner—Henry C. Yuen
Attorney, Agent, or Firm—James A. Wanner; Ted E. Killingsworth; Harold A. Williamson

[57] ABSTRACT

This invention relates to a compact high efficiency furnace having a cylindrical combustion chamber and a fin and tube type heat exchanger substantially parallel, transverse to the furnace air flow, and closely spaced in the air flow direction with no other major heat exchange being utilized. Condensation of fluids from the combustion gases occurs at the fin and tube type heat exchanger, whereby a high efficiency furnace results. The fins and tubes of the heat exchanger are of different materials, requiring that the combustion gas temperature at the heat exchanger inlet be limited.

7 Claims, 3 Drawing Figures

COMPACT HIGH EFFICIENCY FURNACE

FIELD OF THE INVENTION

The present invention relates to hot air furnaces, of the recuperative type, having a combustion chamber and heat transfer means wherein a portion of the heat transfer from the combustion gases to the room air takes place at both the heat exchanger and combustion chamber surface.

BACKGROUND OF THE INVENTION

Hot air furnaces are well known having combustion chambers which provide a portion of the heat transfer and have secondary heat exchangers which provide for the remaining portion of heat exchange of the furnace. Quite often the heat exchanger is either of the drum or clam shell type, both of which take considerable room especially in the vertical dimension, and the latter of which normally incorporates the combustion chamber with the heat exchanger. Furthermore, these types of furnaces are complex and require expensive tooling, particularly when the clam shell type is considered.

As the cost of fuels have become more expensive, it has become increasingly important to increase the efficiency of a furnace. The traditional furnace with a combustor and a single heat exchanger normally has efficiency in the 70–75% range with a sizable portion of the usable heat being lost up the flue. This type of furnace does not utilize the latent heat of condensation obtained by condensing fluids from the combustion gases. Therefore, newer high efficiency furnaces have been designed to not only recover sensible heat, but also a portion of the latent heat of condensation, from the combustion gases prior to their being exhausted through the flue. These furnaces are sometimes referred to as recuperative or condensing furnaces and have an additional heat exchanger. While these furnaces can obtain efficiencies above 90%, they have been quite expensive. Also due to the additional elements, such as the extra heat exchangers, recuperative furnaces require complex designs which either cram more elements within the furnace cavity or require an increased sized furnace cavity in either the vertical or horizontal dimension. Since many furnaces are designed to be used with the central air conditioning, quite often with the air conditioning evaporator A-frame located above the furnace, increased vertical size of the furnace reduces the vertical space available between the top of the furnace and room structures. It would be desirable to reduce the standard furnace size so as to provide more vertical space for the air conditioning evaporator which in turn increases air conditioner efficiency.

It is also known to utilize fin and tube type heat exchangers, as the additional heat exchanger, in a recuperative furnace. Such heat exchangers have tubes made of stainless steel which resist corrosion from the combustion gases and the fluids condensed therefrom. However, it is desirable to utilize aluminum fins on such heat exchangers due to the high heat transfer coefficient of aluminum and its relatively low cost when compared to other high heat transfer materials such as copper. However, the aluminum fins cannot be subjected to excessively high temperatures due to the fin material itself and more importantly due to the relative temperature coefficients of expansion between the aluminum fin and the tube materials, such as stainless steel which causes a breach of the thermal conductivity between the aluminum fins and the tube material, if raised to excessive temperatures.

SUMMARY OF THE INVENTION

Therefore, it is the object of the present invention to provide a compact hot air furnace, and particularly of reduced dimension in the air flow direction.

Another object of the present invention is to provide a relatively simple furnace which is inexpensive to manufacture and utilizes easily constructed combustion chambers with relatively simple and inexpensive, but highly efficient, fin and tube type heat exchangers as a primary heat exchanger.

It is a further object of the present invention to provide a recuperative or condensing high efficiency furnace utilizing the combustion chamber surface and a primary heat exchanger of the tube and fin type for most of the heat exchanger process, and wherein condensation of liquids from the combustion gases occurs in the tubes of the tube and fin type heat exchanger.

Yet another object of the present invention is to provide a recuperative or condensing high efficiency furnace, wherein a fin and tube type heat exchanger is utilized with the heat exhanger tubes and fins being of different materials, the fins preferably of aluminum and the tubes preferably of stainless steel, with the heat exchanger not being subjected to high temperature combustion gases which would reduce the heat transfer characteristics between the tubes and fins, particularly when the fin and tube type heat exchanger is the primary heat exchanger in the furnace with additional heat exchange effect provided by air flow across the combustion chamber.

It is yet another object of the present invention to have a hot air furnace having an elongated generally horizontally mounted combustion chamber and an elongated generally horizontally mounted heat exchanger, with both being disposed transverse to vertical air flow to provide a furnace of reduced vertical dimension. A manifold of simple construction, which only provides minimal heat transfer and thus requires no complex structure, is used to connect the combustion chamber and the heat exchanger. Furthermore, when the cylindrical combustion chamber is of reduced cross section dimension relative to the width of the heat exchanger, internal baffling is used for directing the air flow around the combustion chamber for intimate heat exchange relationship therewith after passing the heat exchanger.

A furnace built according to the teachings of this invention furthermore satisfies the object of being readily changeable from an oil fired furnace to a gas fired furnace or vice versa by the mere substitution of the burner and the combustion chambers without requiring further modification to the furnace. This further permits utilizing different burners and combustion chambers to vary the BTU capacity of the furnace. Independently, the fin and tube type heat exchanger can easily be replaced by a different size fin and tube type heat exchanger without modifying the rest of the furnace structure to provide furnaces of different heating rates or to provide furnaces of different maximum efficiencies dependent upon the desire of the manufacturer. Thus utilizing the principles of the present invention, a plurality of different furnaces can be obtained using the same cabinet, blower and basic combustion gas and air flow structure but permitting the use of various fuels, provide various maximum efficiencies, or provide furnaces of different BTU capabilities.

A further object of the invention is to provide a compact furnace having a furnace chamber with walls defining a flow path for air to be heated, and an air inlet and an air outlet at opposite ends of the furnace chamber. A cylindrical combustion chamber is mounted substantially transverse to the air flow path and has an exterior surface which reaches elevated temperatures during a combustion process therein which produces high temperature combustion gases and is located adjacent said air outlet end of said furnace chamber, and has an outlet for the combustion gases. A planar fin and tube heat exchanger is mounted substantially transverse to the air flow path and substantially parallel to the combustion chamber, with the heat exchanger being located between the combustion chamber and the air inlet and having a combustion gas inlet and having a combustion gas inlet and a combustion gas exhaust. The heat exchanger has a slight downward slope between said gas inlet and said gas exhaust and the temperature drop of the combustion gases, as they pass from said gas intake to said gas exhaust, is in the temperature range sufficient to provide for condensation of fluids from the combustion gases. The heat exchanger has corrosion resistant tubes through which the combustion gases pass and the fins are of a high thermally conductive material, with the fins being in thermally conductive relationship with the tubes. A combustion gas manifold connects the combustion chamber outlet and the heat exchanger gas inlet wherein the temperature of the combustion gases is reduced during travel through the cylindrical combustion chamber and the manifold. The manifold has the primary function of providing a flow path between said combustion chamber outlet and said heat exchanger gas inlet, and only provides a limited amount of heat transfer between the combustion gases and the air to be heated.

BRIEF DESCRIPTION OF THE DRAWINGS

The foregoing and other objects and advantages of the invention will be more readily understood with reference to the description of the preferred embodiment, wherein.

DESCRIPTION OF A PREFERRED EMBODIMENT

Figure 1:
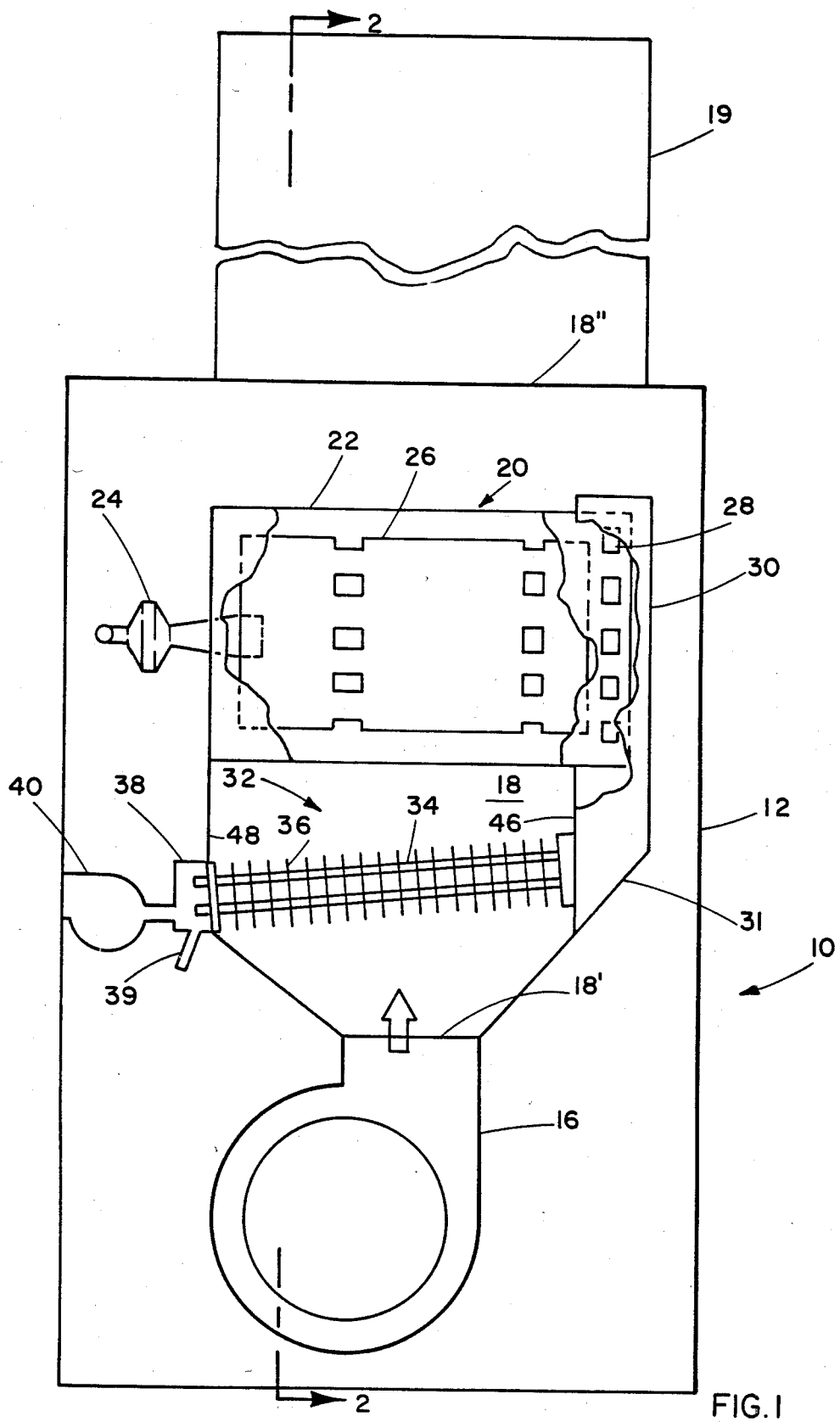
FIG. 1 shows a schematic cross section of a vertical air flow combustion furnace and the general relationship between the combustion chamber, manifold and heat exchanger.

FIG. 1 represents an updraft combustion furnace 10 located in furnace cabinet 12 having an air inlet 14 leading to a blower 16 located near the bottom of the furnace cabinet 12. The blower 12 induces a vertically upwardly air flow through a furnace chamber 18 having an air inlet 18' and an air outlet 18" connected to an exhaust plenum 19 located at the top of the furnace cabinet 12. While an updraft furnace is taught, the principles of the present invention can also be used for a downdraft furnace by mere inversion of the arrangement of parts, or even for a horizontally positioned furnace.

Furnace 10 of the present invention is of compact size in the air flow direction, and when oriented in the vertical direction, provides a low height, thus permitting a relatively tall plenum 19 for positioning of air conditioning elements such as an A-frame evaporator (not shown) for central air conditioning. Air conditioning efficiency is proportional to the height of the A-frame. Thus, by reducing the height of the furnace cabinet 12 a larger vertical dimension is permitted for the plenum 19 which is located above the furnace and below joists if the furnace is located in the basement, or vertical closet space if the furnace is located elsewhere. For a downdraft furnace, the air conditioner evaporator would be below the furnace, but again a reduced height for the furnace allows more vertical space for the evaporator. Of course, for a horizontally disposed furnace the horizontal dimension is reduced compared to many previous furnaces.

Located near the top of furnace cabinet 12 is a combustion chamber 20 which is contemplated to have either a gas or oil burner 24 at the one end thereof. The combustion chamber preferably has an 8 to 10 inch diameter elongated cylindrical surface 22, when used in a 60,000 BTU to 80,000 BTU furnace The generally cylindrical surface 22 of the combustion chamber 20, which also contemplates oval shaped cross sections, permits simple and inexpensive combustor construction, while the length permits a sufficient flow path for the combustion gases to have a significant temperature drop while transmitting heat to the surface 22. The combustion chamber 20 is provided with a burner 24 located in the left or intake end of the combustion chamber. When the furnace is of the oil fired type, a standard oil burner structure is utilized which also includes a 6-8 inch diameter fiberfax tube 26 and centrally located within the combustion chamber 20. When the furnace is gas fired, there is no need for the tube 26. This permits readily changing the furnace from a gas fired or oil fired furnace, or vice versa, by mere substitution of the burners and combustion chamber without modifying other furnace elements. Furthermore, as various burner elements may be substituted to change the BTU capacity of the furnace, generally a larger BTU furnace may require a larger diameter combustion chamber.

The elongated combustion chamber 20 is approximately 15 inches long and horizontally mounted within the furnace chamber 18. Thus the chamber 20 is mounted transverse to the vertical air flow. The combustion process, at the left end of the combustion chamber 22, reaches exceedingly high temperatures, approximately 2000° F. However, as the combustion gases pass through the chamber 20 toward the right, the temperature of the combustion gases is greatly reduced since the exterior surface 22 of the combustion chamber 20 is scrubbed by air flow as described below. As the combustion gases leave the combustion chamber 20 at the outlet or right end thereof through a plurality of outlet ports 28, the temperature of the combustion gases has been reduced to approximately 900° F.

Another type of burner or combustor that is contemplated for use in the compact high efficiency furnace of the present invention and which has been tested and found effective is a pulsing combustor such as disclosed in U.S. Pat. No. 4,480,985 issued Nov. 6, 1984 and referred to therein as a HAZER combustor, referring to Heat Amplification by Stimulated Energy Radiation. Such a combustor again provides a rather elongated combustion chamber, with smaller diameter than its length, that can be readily positioned in the furnace chamber 18 transverse to the air flow.

Surrounding the outlet or right end of the combustion chamber 20 is a manifold or drop box 30. Manifold 30 is vertically disposed adjacent one vertical wall of the furnace cabinet 12 and is generally a rectangular box surrounding ports 28 at the exhaust end of the combustion chamber 20. The manifold 30 at its lower end, is provided an opening receiving the header of a fin and tube type heat exchanger 32, to be described later. The lower end of the manifold 30 may be provided with an angled wall 31 which helps induce the flow of combustion gases toward the heat exchanger 32. The combustion gases when received at the intake upper portion of the manifold surrounding the combustion ports 28 are at approximately 900° F. as stated above. The manifold 30 is of simple construction and is not considered a primary heat exchange surface. However, as there is some air flow interaction with the manifold 30, the combustion gases when leaving the manifold 30 at its lower or exhaust end connected to the heat exchanger 32 have a temperature that is now reduced to 600° F. or lower.

The elongated heat exchanger 32 is planar in nature and comprises a plurality of straight parallel tubes 34 connected by a plurality of fins 36 disposed perpendicular to the tubes 34. While FIGS. 1 and 2 only show two staggered banks of tubes, it is also contemplated that more tube banks can be utilized with the tube banks vertically disposed. The number of tube banks required is dependent upon the width of the furnace limiting the heat exchanger width, the BTU input to the furnace, and the efficiency desired.

Figure 2:
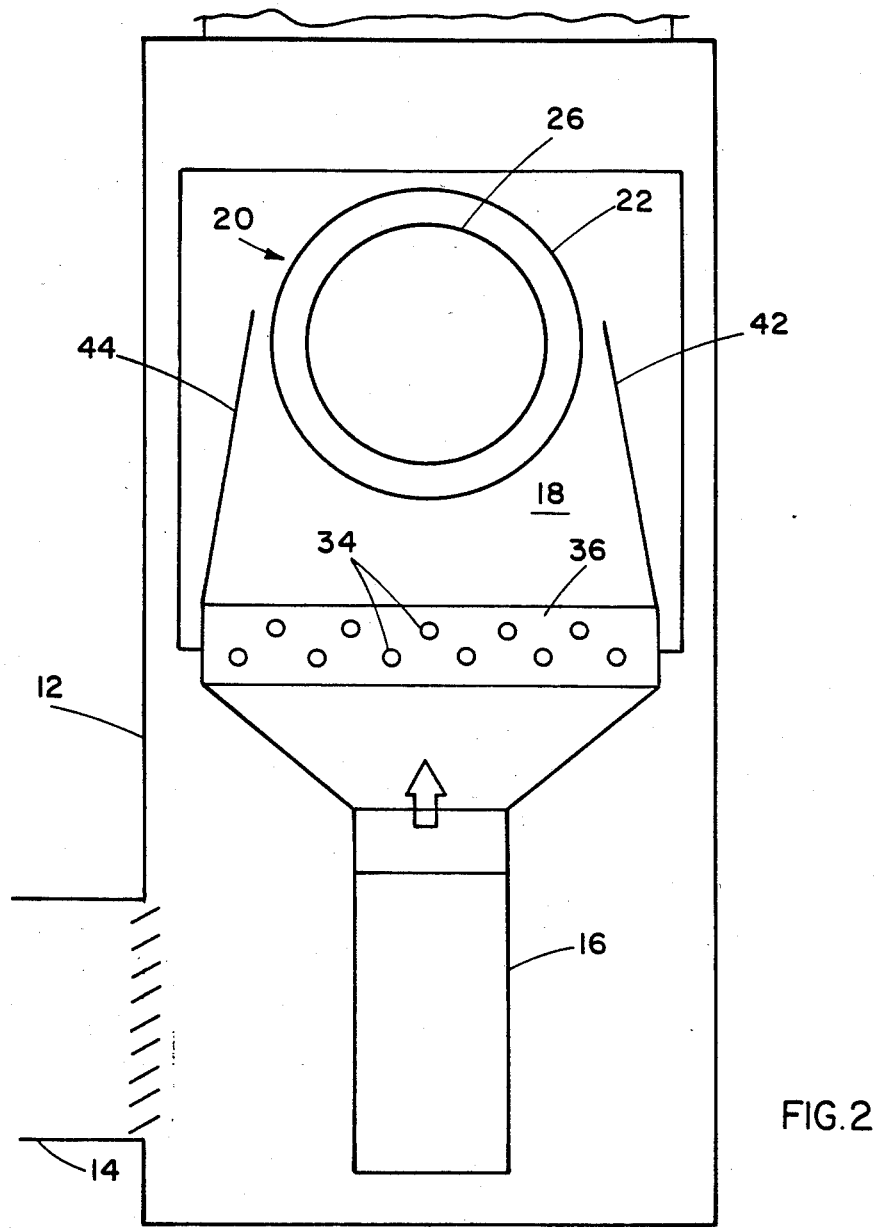
FIG. 2 shows a cross section of the furnace taken along the lines 2—2 of FIG. 1.

The fin and tube type heat exchanger 32 is also substantially horizontally disposed, and thus substantially parallel to the combustion chamber 20 and transverse to the vertical air flow. By parallel, it is meant that the tubes 34, and thus the combustion gas flow, are parallel to the elongated combustion chambers. The heat exchanger 32 is approximately the same 15 inch length as the combustion chamber, except that the combustion chamber 30 extends somewhat into manifold 30 so that the ports 28 are received by the manifold. The heat exchanger 32 has a width (as seen in FIG. 2) of approximately 15 inches and a vertical depth of approximately 4 inches. Preferably, the heat exchanger 32 has a slight downward tilt, approximately 3° to 5°, (exaggerated in FIG. 1), which aids in the draining of condensates removed from the combustion gases. However, this does not detract from the general parallel, and transverse to air flow, positioning of the heat exchanger 32. The right or gas intake end of heat exchanger tubes 34 are connected to the lower or exhaust end of the manifold 30 by suitable means. This permits combustion gases, after passing downwardly through the manifold 30, to pass transversely from right to left through the heat exchanger tubes 34. Located at the left or gas exhaust end of the heat exchanger 32 is a condensate collection box 38, with a drain 39, which is in turn connected to an exhaust blower 40 leading to an exhaust flue (not shown).

The generally parallel relationship of the combustion chamber 20 and the heat exchanger 32, with both being transverse to the air flow and joined by a short manifold (approximately 17 inches in total length, and thus a vertical distance of approximately 10 inches from the center of the 5 inch radius combustion chamber 20 to the vertical center of the heat exchanger 32 gas intake), provides the possibility of a furnace extremely compact in the direction of air flow. Using this design, a 38 to 42 inch high furnace has been achieved as compared to a typical clam shell recuperative furnace height of 48 to 56 inches. This 10 inch to 14 inch reduction in vertical dimension permits using taller plenum chambers 19, which may be 20 inches high or taller.

In order to increase the efficiency of the furnace, the furnace is of the recuperative or condensing type. By condensing fluids from the combustion gases, the latent heat of condensation is recuped permitting the furnace overall efficiency to be increased from approximately 70-75% to above 90% and perferably approximately 95%. This requires that the temperature of the combustion gases be reduced to a temperature permitting condensation of fluids inherent to the combustion gases. The temperature of the combustion gases upon entering the gas inlet or right end of the heat exchanger 32 are below 600° F., but above the temperature permitting condensation of the fluids. However, the temperature of the combustion gases leaving the outlet or left end of the heat exchanger 32 is approximately 100° F. to 120° F. which is below the condensation temperature. Thus the condensation of the fluids from the combustion gases occurs during passage through the heat exchanger 32. It may be necessary to increase the number of tube banks to provide sufficient cooling of the combustion gases to condensate the fluids, especially if a higher BTU capacity furnace is desired or a narrow furnace is needed, which requires less wide tube banks and thus reduces the heat transfer of any given tube bank.

Since the combustion gases and the condensates normally are corrosive, it is necessary to make the tubes 34 of some corrosive resistant material, such as stainless steel, which increases the life of the furnace. While it is ideal from heat exchanger standpoint to make the fins and the tubes of similar materials, this is not practical for a heat exchanger having stainless steel tubes from both a cost and efficiency standpoint. The ideal fin material for the fins 36 is aluminum due to both its lower cost than stainless steel, its considerably higher transfer coefficient, and its malleability permitting easier working. As is standard in fin and tube type heat exchanger design, the aluminum fins 36 provide with a plurality of openings to which the tubes 34 pass with the fins 36 frictionally engaging the tubes 34. The heat exchange between the tubes 34 and the fins 36 is conductive due to this friction fit, normally obtained by expansion of the tubes once the fins are in place. However, aluminum has a much higher temperature coefficient of expansion than stainless steel, and thus as the temperature of the tubes and the fins of the heat exchanger is increased during furnace operation the aluminum fins and the openings therein expand at a greater rate than the circumference of the stainless steel tubes. This difference in thermal expansion has a tendency to break or reduce the conductive frictional bond between the fins and the tubes, which greatly reduces the heat transfer from the tubes to the fins. In order to prevent this adverse effect, it is desirable to keep the temperature of the combustion gases entering the heat exchanger 32 below 600° F., which emperically has been found to be the maximum temperature which does not adversely effect or decrease the conductive relationship between the stainless steel tubes and the aluminum fins at their frictional interface. Therefore, the temperature of the combustion gases after leaving the left end of the combustion chamber 22 should be reduced from approximately 2000° F.

to 600° F. or lower, by passing through the combustion chamber 20 and manifold 30.

In order to assure that all of the air flow passes over both the fin and tube type heat exchanger 32 and the combustion chamber surface 22, baffles 42 and 44 are provided in the furnace chamber 18. It is noted that the heat exchanger 32 has a width greater than the 8-10" diameter of the combustion chamber 20. The baffles 42 to 44, as they extend upwardly, first diverge outwardly from the mouth of the blower 16 and air inlet 18' to the width of the fin and tube type heat exchanger 32. After passing the heat exchanger 32, the baffles 42 and 44 converge inwardly to an upper mouth approximately the width of the combustion chamber 20 to assure that the exterior surfaces 22 of the combustion chamber 20 are scrubbed by the air flow. The baffles 42 and 44, along with an inner surface 46 of the manifold 30 and an opposing wall 48, form the furnace chamber 18 leading from air intake 18'. The chamber 18 walls may extend completely upwardly to the air outlet 18", but this has been found unnecessary, as long as the air flow is directed to scrub the surface 22 of the combustion chamber 20.

Figure 3:
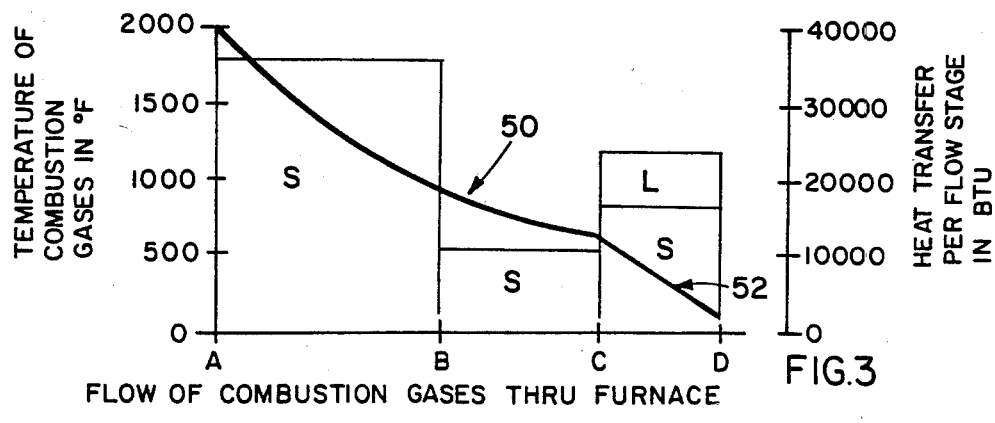
FIG. 3 is a graph illustrating the heat transfer and the temperature drop of the combustion gases as they pass through the furnace.

Line 50 of the temperature graph of FIG. 3 shows the temperature drop of the combustion gases as they pass through the furnace chamber 18. The vertical air flow of the room air first passes the fin and tube type heat exchanger 32 wherein the room air is first heated and then passes the surface 22 of the combustion chamber 20 where the air is further heated. This in turn causes temperature reduction of the combustion gases during passage through the elongated combination chamber 20. The left ordinate of the graph of FIG. 3 represents the temperature of the combustion gases while the abscissa represents the position of the combustion gases relative to its flow through the furnace. The points A through D on the abscissa represent the points of the flow path of the combustion gases as they pass: A, the combustion chamber at the burner 24; B, exit from the combustion chamber 20 into the manifold 30; C, exit the manifold 30 into heat exchanger 32; and D, exit the heat exchanger 32 respectively. A sharper angle slope represented by line 52 in the temperature curve 50 represents the temperature drop of the combustion gases as the fluids are condensated therefrom.

The graph of FIG. 3 also shows the relative heat transfer from the combustion gases as they pass through the furnace. The right ordinate represents heat transfer in BTUs as the gases pass through various stages or sections of the furnace. For a 70,000 BTU furnace slightly more than half, or 36,000 BTU, of heat transfer occurs as the gases pass through the combustion chamber 20. This is represented by the right hand block marked S for sensible heat. The center block marked S represents the 10,000 BTU heat transfer of the manifold, which is less than 15% of the total heat transfer and is also sensible heat loss of the combustion gases. About one-third, or 24,000 BTU, of the heat transfer occurs at the fin and tube heat exchanger 32. This is represented by the right block, part of which is marked S for sensible heat transfer, and part marked L for transfer of latent heat of condensation.

The heat transfer at heat exchanger 32 occurs in the 600° F. to 100° F. range, and thus temperature wise is much closer to the air temperature than the heat exchange from the hotter surface 22 of the combustion chamber 20. Thus the heat exchange at the heat exchanger 32 must be much more effective, requiring an efficient heat exchanger of the fin and tube type. For this reason, and since there is no other major heat exchange until the air flow scrubs the surfaces 22 of the combustion chamber 20, the fin and tube type heat exchanger 32 is considered the primary heat exchanger. In fact, no other heat exchanger, such as a clam shell heat exchange surface, is required between the heat exchanger 32 and the combustion chamber 20 permitting these two elements to be closely vertically spaced to reduce the height of the furnace.

It is noted that by having an elongated combustion chamber in a substantially parallel relationship to a fin and tube type heat exchanger, both mounted transverse to the air flow a substantially low profile furnace is obtained with a less expensive design. Due to the recuperative or condensating type furnace structure contemplated, not only is a compact furnace achieved but also one of extremely high efficiency is achieved. Thus, the objects of the present invention are met.

I claim:

1. A high efficiency furnace having a furnace chamber with walls defining a flow path for air to be heated, an air inlet and an air outlet at opposite ends of said furnace chamber, a combustion chamber mounted in said air flow path and having an exterior surface which reaches elevated temperatures during a combustion process therein which produces high temperature combustion gases, said combustion chamber being located adjacent said air outlet end of said furnace chamber and having an outlet for the combustion gases, a fin and tube heat exchanger mounted substantially transverse to said air flow path, said heat exchanger being located between said combustion chamber and said air inlet and having a combustion gas inlet and a combustion gas exhaust, said heat exchanger having a downward drop between said gas inlet and said gas exhaust and wherein the temperature drop of the combustion gases as they pass from said gas inlet to said gas exhaust is in the temperature range sufficient to provide for condensation of fluids from the combustion gases, said heat exchanger having tubes of a corrosion resistant material through which the combustion gases pass and fins of high thermally conductive material with said fins being in thermally conductive relationship with said tubes, said tube material and said fin material having different temperature coefficients of expansion and wherein the temperature of the combustion gases at said combustion chamber outlet is above a temperature sufficient to cause a substantial decrease in the thermal conductive relationship between said fins and said tubes, a combustion gas manifold connecting said combustion chamber outlet and said heat exchanger gas inlet wherein the temperature of the combustion gases is reduced during travel through said combustion chamber and said manifold, said manifold having the primary function of providing a flow path between said combustion chamber outlet and said heat exchanger gas inlet and only providing a limited amount of heat transfer between the combustion gases and the air to be heated, said combustion gases at said heat exchanger inlet having a temperature below the temperature sufficient to cause a substantial decrease in the thermal conductive relationship between said fins and said tubes, and wherein said furnace chamber is provided with baffles which extend from said heat exchanger and converge inwardly as they approach said combustion chamber so as to direct the air flow passing through said heat exchanger into thermal transfer relationship with the exterior surfaces of said combustion chamber.

2. The furnace in claim 1 wherein said heat exchanger has stainless steel tubes and aluminum fins and the temperature of the combustion gases at said gas inlet is below 600° F.

3. The furnace of claim 2 wherein said furnace chamber is vertically disposed said combustion means and said heat exchange means being closely vertically spaced in substantially parallel horizontal relationship to provide a furnace of reduced vertical dimension.

4. A vertically compact high efficiency furnace having a furnace chamber with walls defining a vertical air flow path for air to be heated, said furnace chamber having an air inlet and an air outlet at opposite ends thereof, an elongated cylindrical combustion chamber having a length greater than its diameter and horizontally mounted within said furnace chamber near said air outlet, said combustion chamber having a burner and a combustion gas outlet adjacent opposite ends thereof, said combustion chamber having an exterior surface which reaches elevated temperatures during the combustion process therein and which produces high temperature combustion gases which pass horizontally through said combustion chamber, an elongated fin and tube heat exchanger mounted within said furnace chamber with tubes substantially parallel to said combustion chamber and located in said air flow path between said air inlet and said combustion chamber, said heat exchanger being planer and having a length similar to length of said combustion chamber and a width which is substantially greater than its depth and the diameter of said combustion chamber, said heat exchanger tubes having a combustion gas inlet and a combustion gas exhaust at opposite ends of said heat exchanger, said heat exchanger having a slight vertical drop between said gas inlet and said gas exhaust and wherein the temperature drop of the combustion gases as they pass through said heat exchanger is within the temperature range sufficient to provide for condensation of fluids from the combustion gases, said heat exchanger tubes being of corrosive resistant material having a low temperature coefficient of expansion, said heat exchanger having fins of aluminum with said fins surrounding said tubes in a thermal conductive relationship thereto, and wherein the difference of thermal coefficients of expansion between said corrosive resistant material and aluminum substantially reduces the heat exchange effectiveness of said heat exchanger when said heat exchanger is subjected to temperatures above a predetermined temperature, said furnace chamber being provided with baffles which extend upwardly from said heat exchanger and converge inwardly as they approach said combustion chamber so as to direct the air flow passing through said heat exchanger into thermal transfer relationship with the exterior surfaces of said combustion chamber, a combustion gas manifold vertically disposed adjacent one side of said furnace chamber and connecting said combustion chamber outlet with said heat exchanger gas inlet, said manifold being of reduced vertical dimension and having the primary function of providing a flow path between said combustion chamber outlet and said heat exchanger gas inlet and only providing a limited amount of heat transfer between the combustion gases and the air to be heated, and wherein the temperature of the combustion gases is reduced during travel through said combustion chamber and said manifold to a temperature below said predetermined temperature prior to inlet to said heat exchanger.

5. The furnace of claim 4 wherein said generally horizontally disposed combustion chamber and said heat exchanger are closely vertically disposed relative to each other within said furnace chamber with no structure therebetween so as to reduce the overall vertical dimension of said furnace.

6. The furnace of claim 5 wherein said tubes are of stainless steel and said predetermined temperature is 600° F.

7. The vertically compact furnace of claim 5 wherein said heat exchanger is of sufficient size relative to surface of said combustion chamber so that approximately one-third or more of the heat transfer from the combustion gases to the air flow occurs as air flow passes over said heat exchanger.

* * * * *